United States Patent
Homedes Pedret et al.

(10) Patent No.: US 10,759,295 B2
(45) Date of Patent: Sep. 1, 2020

(54) PROXIMITY DETECTION CIRCUIT FOR ON-BOARD VEHICLE CHARGER

(71) Applicant: Lear Corporation, Southfield, MI (US)

(72) Inventors: Eladi Homedes Pedret, Valls (ES);
Jordi Escoda Valldeperez, Valls (ES);
Jordi Tost Bartolome, Valls (ES);
Antoni Ferre Fabregas, Valls (ES)

(73) Assignee: LEAR CORPORATION, Southfield, MI (US)

( * ) Notice: Subject to any disclaimer, the term of this patent is extended or adjusted under 35 U.S.C. 154(b) by 346 days.

(21) Appl. No.: 15/891,443

(22) Filed: Feb. 8, 2018

(65) Prior Publication Data
US 2019/0241073 A1    Aug. 8, 2019

(51) Int. Cl.
B60L 53/30   (2019.01)
B60L 53/16   (2019.01)
H01R 13/66   (2006.01)
H02J 7/00    (2006.01)

(52) U.S. Cl.
CPC ............. B60L 53/30 (2019.02); B60L 53/16 (2019.02); H01R 13/6683 (2013.01); H02J 7/007 (2013.01); B60L 2230/12 (2013.01)

(58) Field of Classification Search
CPC ..... B60L 53/30; B60L 53/16; H01R 13/6683; H02J 7/007
See application file for complete search history.

(56) References Cited

U.S. PATENT DOCUMENTS

| | | | |
|---|---|---|---|
| 4,202,218 A | 5/1980 | Romo | |
| 8,305,033 B2* | 11/2012 | Cavanaugh | B60L 1/003 320/104 |
| 9,187,002 B2 | 11/2015 | Kagawa et al. | |
| 9,257,853 B2 | 2/2016 | Okada et al. | |
| 9,333,864 B2* | 5/2016 | Acena | H03K 7/08 |
| 9,413,178 B2 | 8/2016 | Khattab et al. | |
| 9,647,399 B2 | 5/2017 | Kagawa et al. | |
| 10,363,825 B2* | 7/2019 | Rao | H02J 7/0036 |
| 10,596,914 B2* | 3/2020 | Klesyk | B60L 53/00 |
| 2011/0216453 A1 | 9/2011 | Haines et al. | |
| 2012/0032634 A1* | 2/2012 | Cavanaugh | B60L 1/003 320/109 |
| 2013/0214738 A1 | 8/2013 | Chen et al. | |
| 2015/0263549 A1 | 9/2015 | Lee et al. | |
| 2016/0056589 A1 | 2/2016 | Kagawa et al. | |
| 2016/0373166 A1 | 12/2016 | Yang et al. | |
| 2017/0197512 A1 | 7/2017 | Klesyk | |

* cited by examiner

Primary Examiner — Richard V Muralidar
(74) Attorney, Agent, or Firm — Brooks Kushman P.C.

(57) ABSTRACT

A proximity detection circuit suitable for use with an on-board vehicle charger, such as but not limited to the type of chargers used within hybrid and electric vehicles, to facilitate current conservation during period of time when it is unnecessary or otherwise undesirable. The on-board charger can test for connection of a cordset or other electrical connection used to connect the on-board charger to a charging station or other current source. The on-board charger can be used to detect two different cordsets or vehicles using different charging circuitries.

18 Claims, 4 Drawing Sheets

PROXIMITY DETECTION CIRCUIT FOR ON-BOARD VEHICLE CHARGER

TECHNICAL FIELD

The present invention relates to proximity detection circuits of the type suitable for use with on-board vehicle chargers to detect connection to a cordset or other element used to facilitate vehicle charging of a traction battery.

BACKGROUND

An on-board vehicle charger may be used to charge a high voltage battery found in a hybrid electric or electric vehicle to provide energy to an electrically powered motor. In some cases, the charging may be facilitated with a cordset or other element having capabilities to facilitate current delivery to the on-board charger, such as from a wall charger or other type of charging station. The cordset may be include an adaptor to facilitate attachment to a receptacle associated with the on-board charger. The on-board charger may include electronics or other elements to control and manage current flow to the high voltage battery and other the related charging operations.

SUMMARY

A vehicle charging system is described that reduces the quiescent current draw in a high voltage battery charger system. An on-board vehicle charger is operable to charge a high voltage battery with current provided through a cordset connected thereto. The on-board charger uses a regulated voltage from a low voltage power supply in order to detect connection of the cordset and move from a sleep state to an active state, e.g., for charging. A vehicle coupler is on the vehicle and adapted to receive the cordset. A detection circuit is connected to the vehicle coupler and is configured to change the on-board vehicle charger to from sleep state to the active state when a cordset is connected to the vehicle coupler and reduce quiescent current during the sleep state using a switchable resistance.

In an aspect, the switchable resistance includes a first resistor that is a pull-up resistor and by-pass circuitry including a second resistor, which has a lower value than the first resistor, and a switch that is normally open connected in series with the second resistor, and wherein the by-pass circuitry is connected in parallel with the first resistor.

In an aspect, the switch is normally open in a non-charging state and closed by the on-board vehicle charger in a charging state, and wherein the first resistor reduces quiescent current relative to the by-pass circuitry.

In an aspect, the detection circuit includes a Wheatstone bridge with a first leg including the first resistor and the by-pass circuitry and a first node connected to the vehicle coupler.

In an aspect, the vehicle coupler includes a third resistor connected between the first node and ground and a switchable voltage divider circuit that switches to state with the cordset connected in the vehicle coupler.

In an aspect, the Wheatstone bridge includes a second leg and a third leg connected at a second node, and a comparator circuit connected between the first node and the second node, and wherein the comparator circuit sensed an electrical state change at the first node with the cordset being inserted into the vehicle coupler.

In an aspect, the comparator circuit outputs an inactive signal absent the cordset being connected to the vehicle coupler and an active signal when the cordset is inserted and the switch of the by-pass circuitry being in the open position, wherein the change from the inactive signal to the active signal activates an intelligent electronics supply, e.g., a system basis chip, of the on-board charger to waken the on-board charger. In an aspect, the inactive signal is higher than the active signal.

In an aspect, the vehicle coupler includes a switch connected to the first node and a vehicle coupler resistor connecting the switch to ground, wherein the switch changes state when the cordset is to be removed from the vehicle coupler.

In an aspect, the Wheatstone bridge includes a second leg and a third leg connected at a second node, and a comparator circuit connected between the first node and the second node, and wherein the comparator circuit senses an electrical state change at the first node with the cordset being inserted into the vehicle coupler.

In an aspect, the comparator circuit outputs an inactive signal absent the cordset connected to the vehicle coupler and an active signal when the cordset is inserted and the switch of the by-pass circuitry being in the open position.

In an aspect, the inactive signal is high and wherein the active signal is low and the system basis chip switches to an active mode when the inactive signal moves from high to low.

In an aspect, the detection circuit is configurable to adapt to different standardized cordset-vehicle coupler interfaces.

Another aspect of the present disclosure is a proximity detection circuit for a vehicle on-board charger and may include vehicle coupler circuitry and a Wheatstone bridge. The vehicle coupler circuitry includes a switch to change state with a cordset being received in a charging receptacle of a vehicle. The Wheatstone bridge includes a first leg from a portion of the vehicle coupler circuitry, a second leg with a controllable resistance, a third leg, and a fourth leg, the first leg and second leg being connected at a first node, the third and fourth leg being connected at a second node, the Wheatstone bridge further including a center detection circuit connected between the first node and the second node, the center detection circuit outputting a first signal with the Wheatstone bridge balanced and a second signal when the Wheatstone bridge is unbalanced by vehicle coupler circuitry.

In an aspect, the second leg includes a first high resistance to minimize quiescent current draw through the vehicle coupler circuitry and a second resistance lower than the first resistance when the Wheatstone bridge detects the presence of the cordset.

In an aspect, the second resistance is less than half the first resistance.

In an aspect, the vehicle coupler includes a first resistor connected between the first node and ground, a pair of second resistors connected between the first node and ground, and a switch controllable by the presence of the cordset connected intermediate the resistors in the pair of resistors and ground.

In an aspect, the second leg includes a first resistance connected between a voltage source and the first node and a switchable second resistance connected between the voltage source and the first node, and wherein the second resistance is less than the first resistance and is only conductive after the center detection circuit detects the presence of the cordset in the vehicle receptacle and the center detection circuit wakes a microcontroller of the on-board charger.

In an aspect, the Wheatstone bridge disconnects the switchable second resistance when charging is complete and the first resistance is connected in the second leg.

Any of the above examples may be combined with each other to form additional embodiments of the present disclosure.

BRIEF DESCRIPTION OF THE DRAWINGS

The present invention is pointed out with particularity in the appended claims.

However, other features of the present invention will become more apparent and the present invention will be best understood by referring to the following detailed description in conjunction with the accompany drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Charging standards for vehicles may require proximity detection interfaces for the charging process of a high voltage battery of a hybrid vehicle or an electric vehicle. The proximity detection may provide a wakeup capability to the on-board charger based on physical insertion of the cordset into the receptacle to complete an electrical connection, e.g., plug detection. It is desirable for the interface to achieve low quiescent current values. Various embodiments described herein provide circuitry and systems to provide detection, wakeup and low quiescent current draw to preserve the charge in the low voltage battery (e.g., a draw of less than 50 µA). The presently described approaches can achieve lower targets of quiescent current adapting to electrical energy management policies for vehicles (e.g., 20-50 µA).

Figure 1:
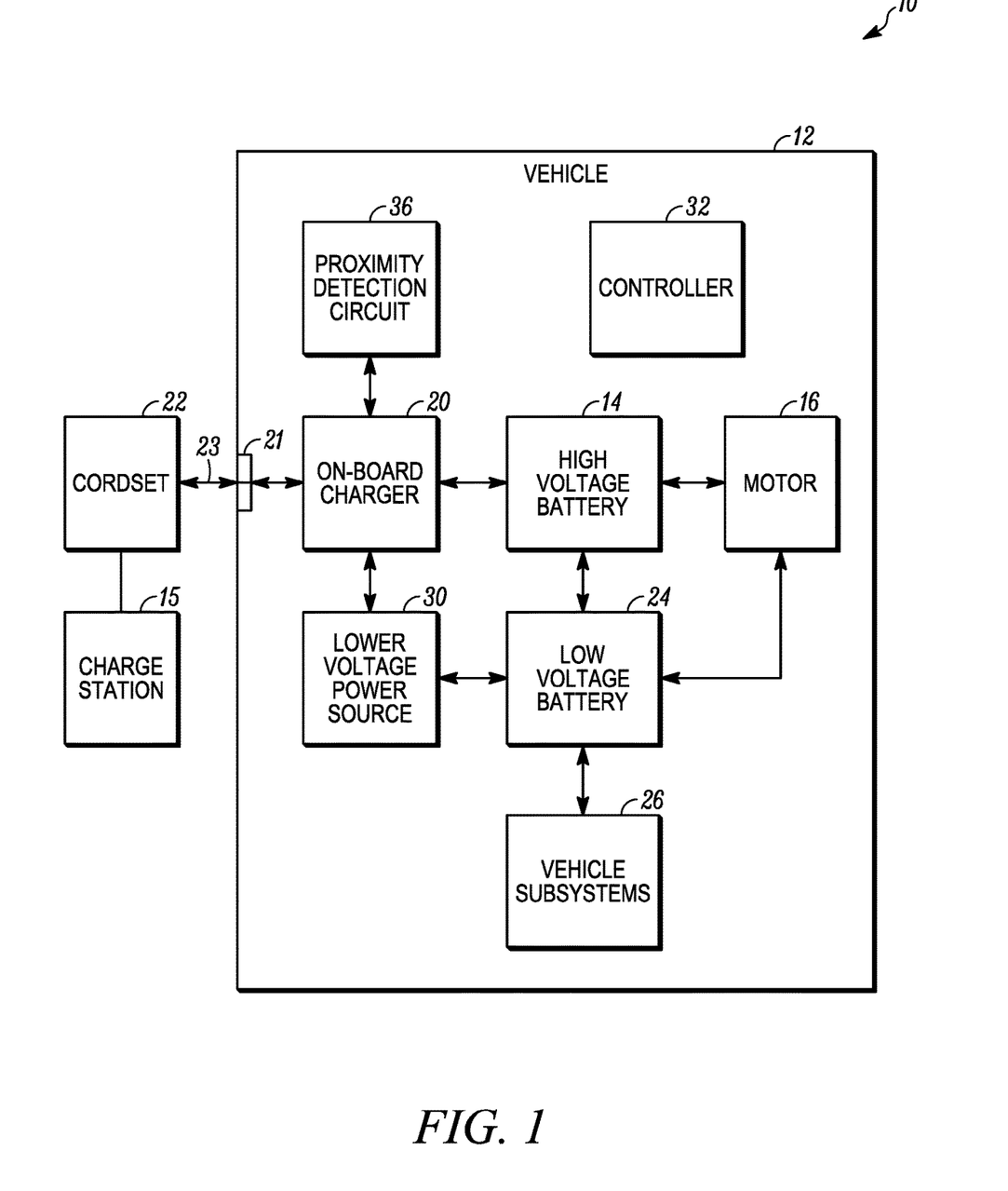
FIG. 1 functionally illustrates a vehicle power system in accordance with one non-limiting aspect of the present invention.

FIG. 1 functionally illustrates logical elements associated with a vehicle power system 10 in accordance with one non-limiting aspect of the present invention. The vehicle power system 10 is shown and predominately described for use within an electric vehicle, hybrid electric vehicle, or other vehicle 12 having a high voltage battery 14 or other energy source operable to provide current sufficient for use by an electric motor 16 to provide motive energy to drive the vehicle 12. The high voltage battery 14 is a traction battery, which can include a plurality of battery cells, to provide high voltage power of over 100 volts, 300 volts, 400 volts, 600 volts or more (e.g., 60 kWh, 85 kWh). The vehicle 12 includes an on-board charger 20 to facilitate charging the high voltage battery 14 with current delivered through a cordset 22 used to connect the on-board charger to a wall charger or other charging station 15. The charging station 15 can receive its electrical power from a mains power. The cordset 22 is used to deliver current through a cable 23 having a terminal (not shown) at one end adapted for receipt within a receptacle or inlet 21 on the vehicle associated with the on-board charger 20.

The on-board charger 20 may include electronics, circuitry or other elements operable to control and manage current flow used to support charging related operations for the high voltage battery 14, and optionally, to support charging or otherwise powering a low voltage battery 24, one or more vehicle subsystem 26, and/or other electronically operable elements included within the vehicle 12. The low voltage battery 24 may be included to support powering vehicle systems 26 that operable at voltages lower than the electric motor 16, such as but not limited to remote keyless entry systems, heating and cooling systems, infotainment systems, braking systems, etc. In various applications, the low voltage battery provides twenty-four volts, twelve volts, six volts or other voltages less than 50 volts. In addition to being charged with energy provided through the cordset 22, one or more of the high and low voltage batteries 14, 24 and vehicle subsystems 26 be operable to power each other and/or to be powered with energy generated by the electric motor 16.

The low voltage battery 24, for example, may be operable to provide current sufficient for use by a lower voltage power source 30. The lower voltage power source 30 may be operable to regulate current from the low voltage battery 24 for use with one or more of the vehicle subsystems 26 and/or the on-board charger 20. A controller 32 may be included to facilitate executing logical operations and undertaking other processing requirements associated with the vehicle 12 (optionally, one or more of the elements may include their own controller or processor). For exemplary purposes, the terms "lower", "low" and "high" are used to differentiate voltage levels respectively coinciding with approximately 5 VDC, 12 VDC, and 200 VDC, which are commonly used within vehicles to support the operation associated with each of the corresponding energy sources. This is done without intending to unnecessarily limit the scope and contemplation of the present invention as the present invention fully contemplates the energy sources having the same or different voltage levels and/or current production/generation capabilities.

One non-limiting aspect of the present invention contemplates the lower voltage power source 30 being operable to set a voltage used by the on-board charger 20 to test for connection of the cordset 22. The lower voltage source 30, for example, may be a voltage or current regulator having capabilities sufficient to compensate for voltage variation of the low and/or high voltage battery 14, 24 in order to provide steady voltage to the on-board charger 20 and/or other element electrically connected thereto, which may be sensitive to voltage variations. The lower voltage power source 30 may be placed in a sleep state when not in use so as to prevent consumption of current from the low voltage battery 24. The lower voltage power source 30 has an active state when desired to provide current and regulate voltage from the low voltage battery 24. The sleep state may still draw a quiescent current from the low voltage battery 24.

One non-limiting aspect of the present disclosure contemplates minimizing the amount of current consumed while the on-board charger 20 is not being used (e.g., while the vehicle is off, the cordset is disconnected, etc.). The current conservation contemplated by one non-limiting aspect of the present invention may be achieved by transitioning the lower voltage power source 30 to the sleep state when operation of the on-board charger 20 is unnecessary, and thereafter transiting the lower voltage source 30 from the sleep state to the active state when use of the on-board charge 20 is desired. With the low voltage power source 30 in the sleep mode, no electronics can be powered in an active mode, but the electronics cannot react in any way.

A proximity detection circuit 36 may be included in accordance with one non-limiting aspect of the present invention to facilitate a current conservative configuration operable to facilitate registering connection of the cordset 22 to the on-board charger 20 while the lower voltage power source 30 is in the sleep or inactive state. The proximity detection circuit 36 may be operable to transition the lower voltage power source 30 from the sleep state to the active state while consuming less than 50 uA, which may be desired or required in vehicle specifications. Once the lower voltage power source 30 is activated by the proximity detection circuit 36, the electronics of the on-board charger 20 may then be used to detect a proper connection of the cordset and initiate the charging of the HV battery 14. The power source 30 includes some processing capabilities to read the signal, identify the signal transition and to reactivate the supply to other electronic stages, including the main controller.

The embodiments shown in FIG. 1 separates some the modules and circuitry for ease of illustration and explanation. It will be recognized that certain modules can be combined or circuitry and functions can be moved to other locations or shared between locations. For example, the cordset might already include the electronics for a direct connection to mains supply, e.g., a charge station is not required. In some uses the term on-board charger may include multiple blocks as shown in FIG. 1. That is, an on-board charger may include the AC to DC power energy transfer system to charge the battery and include any of the on-board charger 20, the proximity detection circuit, 36, the controller 32, the low voltage power source 30 and, a vehicle subsystem 26, or parts thereof.

Figure 2:
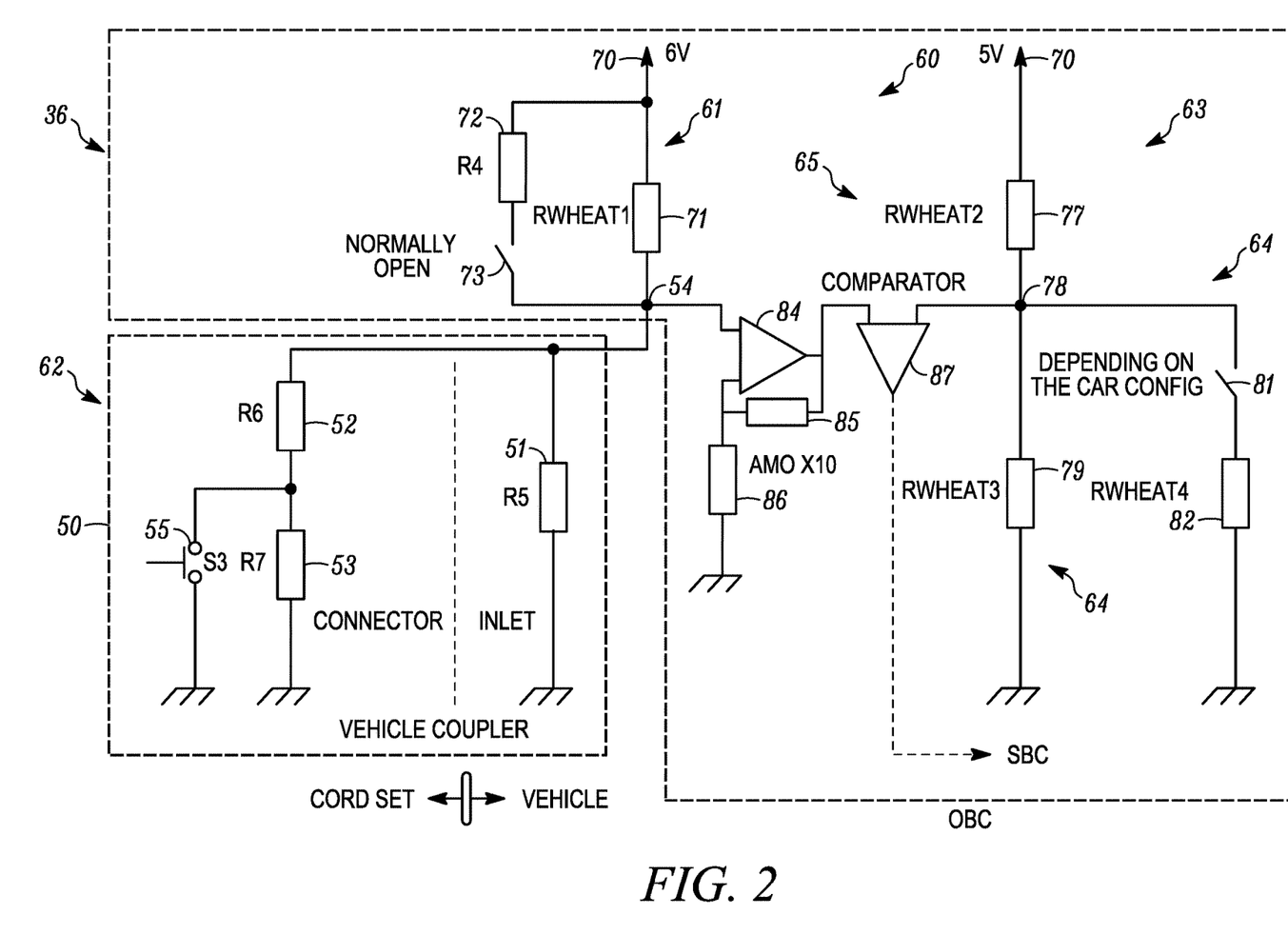
FIG. 2 illustrates a proximity detection circuit in accordance with one non-limiting aspect of the present invention.

FIG. 2 schematically illustrates the proximity detection circuit 36 in accordance with one non-limiting aspect of the present invention. The proximity detection circuit 36 is intended to encompass the circuit related elements (switches, resistors, capacitors, amplifiers, comparators, diodes, etc.) shown in FIG. 2 and is not intended to necessarily require those circuit elements to be part of a dedicated circuit. Rather, the circuit elements may be part of any one or more of the logical elements shown in FIG. 1, i.e., some or all of the illustrated circuit components may be included in some or all of the on-board charger 20, the lower voltage power source 30, the vehicle subsystems 26, the controller 32, the motor 16, etc. While multiple circuit elements are shown to achieve certain results, the present invention fully contemplates the use of other circuit elements to achieve similar results, particularly the use of other current conservative elements.

Figure 3:
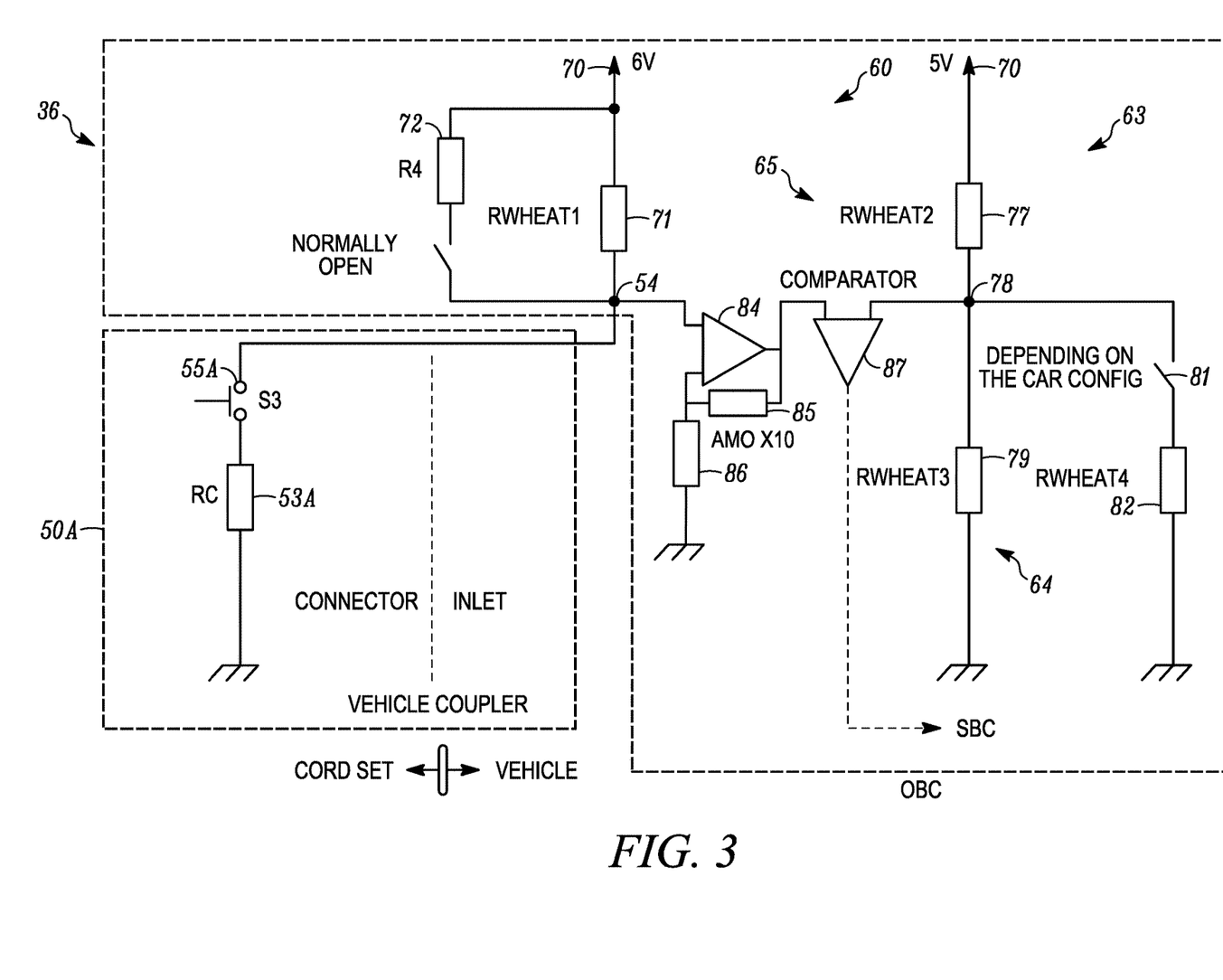
FIG. 3 illustrates a proximity detection circuit in accordance with one non-limiting aspect of the present invention.

When the cordset 22 is connected to the on-board charger 20, the circuit 36 is configured such that the cordset 22 forms part of the proximity detection circuit 36 as designated by vehicle coupler 50. Both cordset 22 and a vehicle coupler include basic signaling to initiate, control and terminate the charging process. The signaling and the associated electronic components in these is standardized differently in different countries or regions worldwide (e.g., by national or international standards). A vehicle on-board charger 20 must, then, be able to work with any such regional interface differences. The vehicle coupler 50 includes a resistor 51 connected between a first node 54 and ground. A series of resistors, here illustrated as resistor 52 and resistor 53, are connected in parallel with the resistor 51, i.e., from the first node 54 to ground. A switch 55 is connected intermediate the series of resistors 52, 53. In an example, the ground may be grounded to the vehicle chassis. In this manner, the cordset 22 may be considered to form part of the proximity circuit 36 when inserted within the vehicle charging receptacle 21 used to connect it to the on-board charger 22. The switch 55 can be manually activated switch on the connector of the cordset, e.g., the end gun. The user can activate the switch 55 prior to disconnecting the cordset from the vehicle. This warns associated electronics of imminent cordset disconnection and charging is halted. In another standardized connection as shown in FIG. 3, the switch 55A is closed the moment the connector of the cordset is inserted into the vehicle. The user may press a button to open the switch for removing the cordset.

The proximity detection circuit 36 includes a Wheatstone bridge 60 having a first leg 61, a second leg 62, a third leg 63, a fourth leg 64 and a center circuitry 65 intermediate the four legs 61-64. The central circuitry 65 is configured to measure a change in state of the signals at the Wheatstone bridge 60 to output a signal to wake the on-board charger 20 when the cordset 22 is connected to the receptacle 21, e.g., by outputting a change of level signal to a system-based-chip that is part of the low voltage power source 30. In an example, the center circuitry 65 outputs a high-level signal when no cordset is detected and a low-level signal when the cordset is detected while the on-board charger is in a sleep state.

The first leg includes a first resistor 71 connected between a voltage source 70 and the first node 54. A by-pass circuit, including a by-pass resistor 72 and a switch 73, are connected in parallel to the first resistor 71. The voltage source 70 is at an operational voltage provided by the low voltage battery 24, and can be a rail voltage, e.g., 5 volts or 3 volts. The switch 73 is normally open and can be controlled by logic within the on-board charger 20 or low voltage power source 30 with the switch 73 being closed when the cordset 22 is connected to the receptacle 21 and the on-board charger charging the high voltage battery 14. The first resistor 71 has a significantly higher resistance than the by-pass resistor 72 to reduce quiescent current draw from the low voltage battery through the on-board charger and proximity detection circuit 36 to ground. In an example, the by-pass resistor 72 is about half or less of the value of the first resistor 71. The by-pass resistor 72 can be selected based on other standards or vehicle charging circuitry designs. More specifically, when charging is not occurring the first resistor 71 and the resistor 51 provide a path from the voltage source (e.g., low voltage battery) and ground. This could undesirably discharge the low voltage battery 24 if the value of the first resistor 71 is too low.

The second leg 62 includes the vehicle coupler circuitry 50. The second leg 62 has the resistor 51 between the first node 54 and ground in parallel with the resistors 52, 53.

The third leg 63 includes a second resistor 77 connected between the voltage source 70 and a second node 78.

The fourth leg 64 includes a resistor 79 between the second node 78 and ground. A fourth leg circuitry with a switch 81 and a further resistor 82 connected from the second node 78. The switch 81 can be controlled by the vehicle configuration to either include the resistor 82 or not in the fourth leg. By this configuration change, the Wheatstone bridge 60 may be adapted to the different standardized values for resistors 51, 52, 53 and 53A.

The center circuitry 65 includes a sensor circuit including an amplifier 84 with a feedback of two resistors 85, 86 to an amplifier input. The other input to the amplifier 84 is connected to the first node 54. The amplifier 84 can be a noninverting amplifier. The amplifier 84 changes its output when the cordset is connected to the receptacle, e.g., the resistors 52, 53 and switch 55 are connected to the remainder of the proximity detection circuit 36 and the voltage at the first node 54 changes with the resistors 52, 53 in parallel with the inlet resistor 51. A comparator 87 receives the output from the amplifier 84 and the signal (i.e., the voltage) at the second node 78 of the Wheatstone bridge 60. The comparator 87 outputs a wake signal to the intelligent electronics supply, which can include a system basis chip of the on-board charger 20. The intelligent electronics supply includes circuitry, including discrete parts, integrated circuits and combinations thereof. In an example, the comparator's wake signal is a change of state, e.g., from high to low or from low to high. This wakes the on-board charger 20 from a low power mode (e.g., a sleep mode) and its internal circuitry and algorithms then operate to charge the high voltage battery 14. The power to operate the on-board charger 20 and the proximity detection circuit 36 is from the low voltage battery 24. It is desirable to minimize the quiescent current to avoid discharging the low voltage battery 24.

When the on-board charger 20 is woken (from a sleep, low power state) by the signal from the comparator 87 based on the measured change of state in the Wheatstone bridge 60 by insertion of the cordset into the receptacle, the on-board charger 20 controls the state of the switch 73. When charging, the resistor 72 is conductive in parallel with the resistor 71. The resistor 72 places the proximity detection circuitry in a state for charging operation, which is not concerned with quiescent current. When charging is complete, the on-board charger 20 opens the switch 73 and the higher value resistor 71 is present in the Wheatstone bridge and draws significantly less current from the voltage supply 70, which is powered by the low voltage battery 24. This lessens the quiescent current drawn from the low voltage battery by the proximity detection circuit 36.

FIG. 3 is similar to the embodiment of FIG. 2 but has a different vehicle coupler 50A. The vehicle coupler 50A does not have the resistor 51 connected between the first node 54 and ground. The vehicle coupler 50A does not have the resistor 52. The switch 55A and resistor 53A are connected differently than in the FIG. 2 embodiment. The switch 55A is connected at one end to the first node 54 and to ground through the resistor 53A. The Wheatstone bridge 60 is the same and operates in the same manner. Thus, the present circuitry to awaken the on-board charger can operate for either type of vehicle coupler 50 or 50A.

In some cases, a lock or other actuator (not shown) may be included to secure the cordset 22 within the receptacle 21 or to otherwise facilitate user actuation of a device intended to reflect connection of the cordset. The switch 55 may be actuated from a normally open position to the closed positioned when the actuator is closed. As described below in more detail, resistors 51 and 52 may be included to induce certain voltages depending on whether the switch 55 is closed (i.e., actuator closed) to short resistor 53. The elements associated with the cordset connection to the outlet and the actuator may be identified as a connection circuit portion of the proximity circuit 36.

Figure 4:
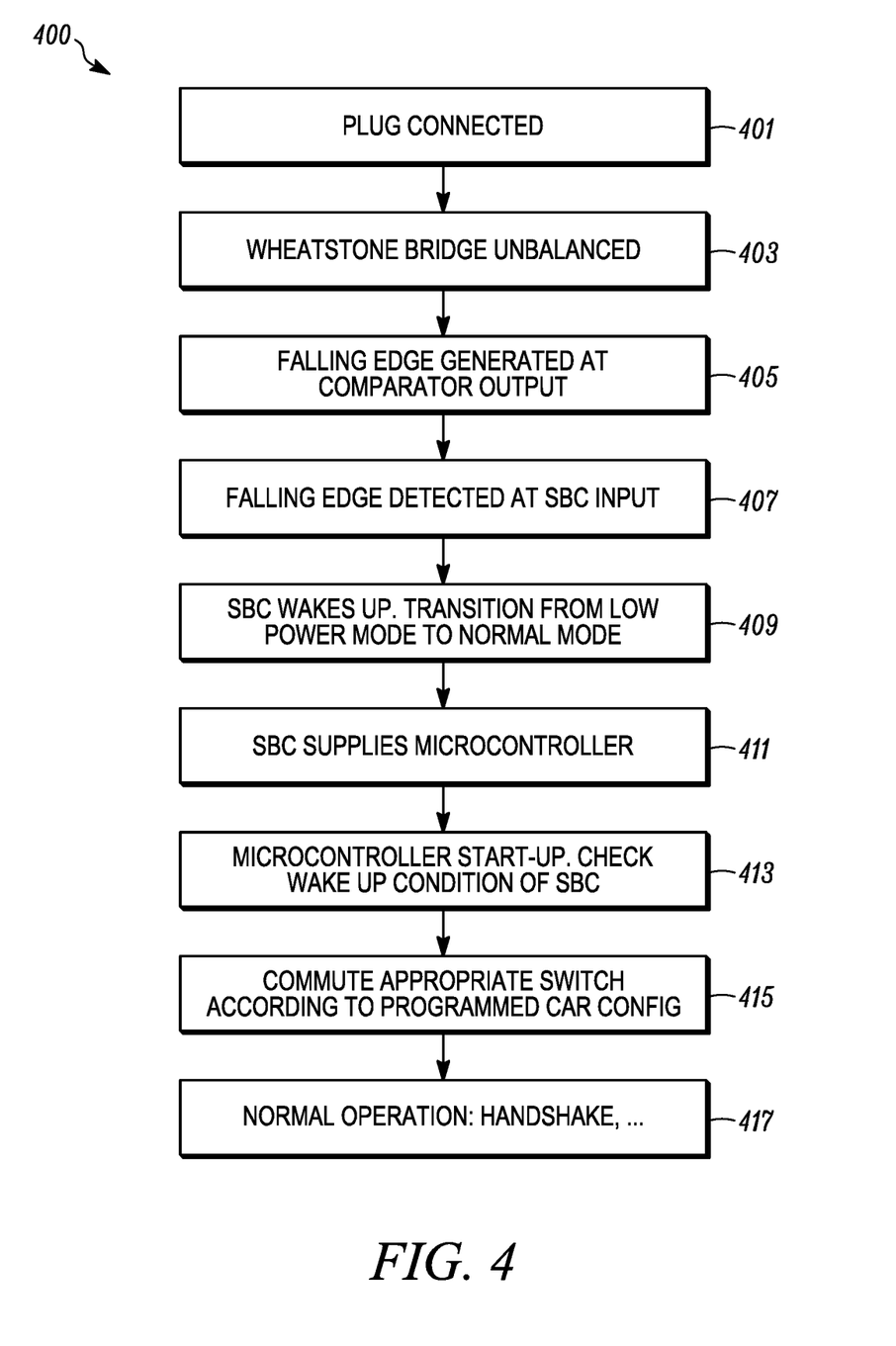
FIG. 4 illustrates a flow chart for a charging operation of a vehicle in accordance with one non-limiting aspect of the present invention.

FIG. 4 illustrates a method 400 for operating the on-board charger and proximity circuit 36. At 401, a charging plug of a cordset is connected to the vehicle. The connection of the charging plug unbalances the Wheatstone bridge at 403. At 405, the sensing circuitry of the Wheatstone bridge outputs a falling edge at the comparator output. At 407, the falling edge signal is detected at the system basis chip, e.g., in the low voltage power source 30. At 409, the system basis chip of the low voltage power source 30 operates to wake up the on-board charger based on detection of a change in a sensed signal, e.g., the falling edge of the sensed signal. This transitions the system basis chip from a low power mode (e.g., a sleep mode) to a normal mode (e.g., operational mode or charge mode). At 411, the system basis chip powers the microcontroller of the on-board charger, e.g., the controller 32 or controller circuitry of the on-board charger 20. At 413, the microcontroller wakes from a low power mode and checks the wake condition of the system basis chip to confirm that a cordset connection was detected. At 415, the microcontroller commutes the switch 73, (e.g., closes switch 73 according to the programmed car configuration. Closing switch 73 allows the Wheatstone bridge to make accurate readings. Closing switch 81 adapts the circuitry to a standardized interface. The switch 81 can be set at vehicle manufacture to conform the vehicle to a specific charging standard for a vehicle use region, Europe, North America, Asia, and the like. Optionally, the switch can also be controlled by the vehicle controller. At 417, the microcontroller starts the normal operation of the on-board charger, starting with handshakes to the various communication devices. The on-board charger can now execute its charging programming.

As supported above, the present invention is able to conserve current consumption of a lower voltage power source used to provide a test voltage that operates with electronics of an on-board charger or other testing element to detect a voltage value associated with a connection status of a cordset or other element used to electrically connect an on-board vehicle charger to a charging station (or another charging source) or other element remote from the vehicle. The related circuit may utilize a modified Wheatstone bridge with a selectable leg of the bridge to provide a reduced quiescent current consumption with the cordset being connected to the vehicle and, in some aspects, providing a wakeup signal to the on-board vehicle charger. The electronic circuitry including a wiring configuration that is specified for charge coupler to wake-up an on-board charger for a plug-in hybrid vehicle or electric vehicle. The circuitry may have a low-quiescent current draw from the low-voltage battery and use the actual charge coupler connector to complete the circuit used to wake-up the power supply of the on-board charger. The circuit may be constructed entirely out of hardware components such that the wake-up voltage can be generated without using a processor having to issue instructions or generate signals according to stored code. In the event a processor is required to transition the lower voltage source to sleep mode, the present disclosure is configured to awaken the sleeping lower voltage processor without requiring processor operations.

The aspects of the present disclosure can address both use cases of FIGS. 2 and 3 as these use cases may provide different voltage ranges to be measured. In some use cases, the same voltage value can be detected as plugged-in one use, but unplugged in another use. Aspects of the present disclosure use a configurable Wheatstone bridge by means of switches controlled by either a microcontroller or a system basis chip, or other controlling circuitry, e.g., a bistable relay or programmable logic array. When there is no plug physically connected to the vehicle receptacle, the Wheatstone bridge is composed by high-value resistors, that minimizes the current consumption (i.e., low quiescent current state). Once the plug is physically connected to the vehicle receptacle, there is a voltage drop on a leg of the Wheatstone bridge, which is amplified and compared to a reference value. This unbalanced response is detected by a differential operational amplifier and it produces a pulse that awakes the system basis chip that then activates its internal supply outputs to energize the microcontroller and other electronic peripherals, thus awaking the system. At this point, the microcontroller recognizes the wake-up basis and disables the high value pull up resistor (e.g., resistor 71) and enables the pull-up resistor (e.g., resistor 72) defined by use case. The pull-up resistor is not selected to minimize current draw from the low voltage battery. When the vehicle charging is complete or the cordset is removed, then the microcontroller will allow the switch to open and disable the pull-up resistor.

The present disclosure uses the phrase quiescent current to describe certain current through the circuitry. The charging circuitry can be used to charge a high voltage, traction battery. When the vehicle is not charging the high voltage battery, the charging circuitry is in a quiet state. The circuitry will still draw current in the quiet state. This is an example of "quiescent current."

The presently described circuitry for detecting connection of a cord set operates drawing a low quiescent current and can operate with multiple vehicle coupler configurations. It is desirable to reduce the quiescent current draw and provide detection circuitry to wake the charging circuitry for a vehicle traction battery.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle charging system, comprising:
   an on-board vehicle charger being operable to charge a high voltage battery with current provided through a cordset connected thereto, the on-board charger requiring regulated voltage from a low voltage power supply to detect connection of the cordset and move from a sleep state to an active state;
   a vehicle coupler on a vehicle and configured to receive the cordset; and
   a detection circuit connected to the vehicle coupler and configured to change the on-board vehicle charger to from sleep state to the active state when a cordset is connected to the vehicle coupler and reduce quiescent current during the sleep state using a switchable resistance, wherein the switchable resistance includes a first resistor that is a pull-up resistor and by-pass circuitry including a second resistor, which has a lower value than the first resistor, and a switch that is normally open connected in series with the second resistor, and wherein the by-pass circuitry is connected in parallel with the first resistor.

2. The vehicle charging system of claim 1, wherein the switch is normally open in a non-charging state and closed by the on-board vehicle charger in a charging state, and wherein the first resistor reduces quiescent current relative to the by-pass circuitry.

3. The vehicle charging system of claim 1, wherein the detection circuit includes a Wheatstone bridge with a first leg including the first resistor and the by-pass circuitry and a first node connected to the vehicle coupler.

4. The vehicle charging system of claim 3, wherein the vehicle coupler includes a third resistor connected between the first node and ground and a switchable voltage divider circuit that switches to state with the cordset connected in the vehicle coupler.

5. The vehicle charging system of claim 3, wherein the Wheatstone bridge includes a second leg and a third leg connected at a second node, and a comparator circuit connected between the first node and the second node, and wherein the comparator circuit sensed an electrical state change at the first node with the cordset being inserted into the vehicle coupler.

6. The vehicle charging system of claim 5, wherein the comparator circuit outputs an inactive signal absent the cordset being connected to the vehicle coupler and an active signal when the cordset is inserted and the switch of the by-pass circuitry being in the open position, wherein the change from the inactive signal to the active signal activates an intelligent electronics supply of the on-board charger to waken the on-board charger.

7. The vehicle charging system of claim 6, wherein the inactive signal is higher than the active signal.

8. The vehicle charging system of claim 3, wherein the cordset includes a switch connected to the first node and a vehicle coupler resistor connecting the switch of the cordset to ground, wherein the switch of the cordset changes state when the cordset is to be removed from the vehicle coupler.

9. The vehicle charging system of claim 8, wherein the Wheatstone bridge includes a second leg and a third leg connected at a second node, and a comparator circuit connected between the first node and the second node, and wherein the comparator circuit senses an electrical state change at the first node with the cordset being inserted into the vehicle coupler.

10. The vehicle charging system of claim 9, wherein the comparator circuit outputs an inactive signal absent the cordset connected to the vehicle coupler and an active signal when the cordset is inserted and the switch of the by-pass circuitry being in the open position.

11. The vehicle charging system of claim 10, wherein the inactive signal is high and wherein the active signal is low and an intelligent electronics supply of the on-board charger switches to an active mode when the inactive signal moves from high to low.

12. The vehicle charging system of claim 3, wherein the detection circuit is configurable to adapt to different standardized cordset-vehicle coupler interfaces.

13. A proximity detection circuit for a vehicle on-board charger, comprising:
   vehicle coupler circuitry to receive a cordset in a charging receptacle of a vehicle; and
   a Wheatstone bridge including a first leg from a portion of the vehicle coupler circuitry, a second leg with a controllable resistance, a third leg, and a fourth leg, the first leg and second leg being connected at a first node, the third and fourth leg being connected at a second node, the Wheatstone bridge further including a center detection circuit connected between the first node and the second node, the center detection circuit outputting a first signal with the Wheatstone bridge balanced and a second signal when the Wheatstone bridge is unbalanced by vehicle coupler circuitry.

14. The proximity detection circuit of claim 13, wherein the second leg includes a first resistance to minimize quiescent current draw through the vehicle coupler circuitry and a second resistance lower than the first resistance when the Wheatstone bridge detects the presence of the cordset.

15. The proximity detection circuit of claim 14, wherein the second resistance is less than half the first resistance.

16. The proximity detection circuit of claim 13, wherein the vehicle coupler includes a first resistor connected between the first node and ground, a pair of second resistors connected between the first node and ground, and a switch controllable by the presence of the cordset connected intermediate the resistors in the pair of resistors and ground.

17. The proximity detection circuit of claim 13, wherein the second leg includes a first resistance connected between a voltage source and the first node and a switchable second resistance connected between the voltage source and the first node, and wherein the second resistance is less than the first resistance and is only conductive after the center detection circuit detects the presence of the cordset in the charging receptacle and the center detection circuit wakes a microcontroller of the on-board charger.

18. The proximity detection circuit of claim 17, wherein the Wheatstone bridge disconnects the switchable second resistance when charging is complete and the first resistance is connected in the second leg.

* * * * *